(12) United States Patent
Arai et al.

(10) Patent No.: US 9,510,047 B2
(45) Date of Patent: Nov. 29, 2016

(54) SYSTEMS AND METHODS FOR AUTOMATICALLY PERFORMING MEDIA ACTIONS BASED ON STATUS OF EXTERNAL COMPONENTS

(71) Applicant: United Video Properties, Inc., Santa Clara, CA (US)

(72) Inventors: China Arai, Valley Glen, CA (US); Michael R. Nichols, La Canada Flintridge, CA (US)

(73) Assignee: Rovi Guides, Inc., San Carlos, CA (US)

(*) Notice: Subject to any disclaimer, the term of this patent is extended or adjusted under 35 U.S.C. 154(b) by 33 days.

(21) Appl. No.: 14/463,805

(22) Filed: Aug. 20, 2014

(65) Prior Publication Data
US 2016/0055879 A1  Feb. 25, 2016

(51) Int. Cl.
| | |
|---|---|
| H04N 5/765 | (2006.01) |
| H04N 9/80 | (2006.01) |
| H04N 5/783 | (2006.01) |
| H04N 21/442 | (2011.01) |
| H04L 12/26 | (2006.01) |
| H04N 21/41 | (2011.01) |
| H04N 21/4147 | (2011.01) |
| H04N 21/436 | (2011.01) |
| H04N 21/433 | (2011.01) |
| G11B 19/02 | (2006.01) |
| H04N 21/432 | (2011.01) |
| H04N 21/845 | (2011.01) |

(52) U.S. Cl.
CPC ....... *H04N 21/44227* (2013.01); *G11B 19/025* (2013.01); *H04L 43/08* (2013.01); *H04N 21/4131* (2013.01); *H04N 21/4147* (2013.01); *H04N 21/4325* (2013.01); *H04N 21/4333* (2013.01); *H04N 21/4334* (2013.01); *H04N 21/43615* (2013.01); *H04N 21/44231* (2013.01); *H04N 21/8455* (2013.01)

(58) Field of Classification Search
USPC .................................. 386/239–248, 291–299
See application file for complete search history.

(56) References Cited

U.S. PATENT DOCUMENTS

| | | | |
|---|---|---|---|
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,542,816 B2 | 6/2009 | Rosenberg |
| 7,761,892 B2 | 7/2010 | Ellis et al. |
| 8,046,801 B2 | 10/2011 | Ellis et al. |
| 2002/0174430 A1 | 11/2002 | Ellis et al. |

(Continued)

FOREIGN PATENT DOCUMENTS

| | | |
|---|---|---|
| EP | 2 629 207 | 8/2013 |
| JP | 2002247490 | 8/2002 |

(Continued)

*Primary Examiner* — Hung Dang
(74) *Attorney, Agent, or Firm* — Ropes & Gray LLP

(57) ABSTRACT

Systems and methods for automatically performing a media action based on the status of external components are provided. A media asset is determined to be presented on a user equipment device. Components external to the user equipment device are monitored to obtain status information pertaining to the components. A determination is made as to whether a media action is associated with the status information. The identified media action is performed for the media asset in response to determining that the media asset is associated with the status information.

18 Claims, 4 Drawing Sheets

500

| Status of External Component | Media Action |
|---|---|
| Garage Door Opening; Lights Turning Off | Record Currently Received Content |
| Door Bell Rings; Front Door Opening | Pause Currently Received Content |
| Garage Door Closing; Lights Turning On | Play Previously Recorded Content |
| Kitchen Fridge Opening Dishwasher is On | Volume Up |
| • <br> • <br> • | • <br> • <br> • |

(56) References Cited

U.S. PATENT DOCUMENTS

| | | | |
|---|---|---|---|
| 2003/0070182 A1* | 4/2003 | Pierre | H04N 5/76 725/135 |
| 2003/0088872 A1* | 5/2003 | Maissel | G11B 27/002 725/46 |
| 2003/0097659 A1 | 5/2003 | Goldman | |
| 2003/0110499 A1 | 6/2003 | Knudson et al. | |
| 2005/0251827 A1 | 11/2005 | Ellis et al. | |
| 2008/0140818 A1* | 6/2008 | Du Breuil | H04L 12/282 709/223 |
| 2009/0043496 A1 | 2/2009 | Koga et al. | |
| 2010/0153885 A1 | 6/2010 | Yates | |
| 2010/0220972 A1 | 9/2010 | Bryan | |
| 2010/0272414 A1* | 10/2010 | Reneris | H04N 21/4882 386/291 |

FOREIGN PATENT DOCUMENTS

| | | |
|---|---|---|
| JP | 2005223778 | 8/2005 |
| JP | 2009004842 | 1/2009 |
| WO | WO2004/039072 | 5/2004 |

\* cited by examiner

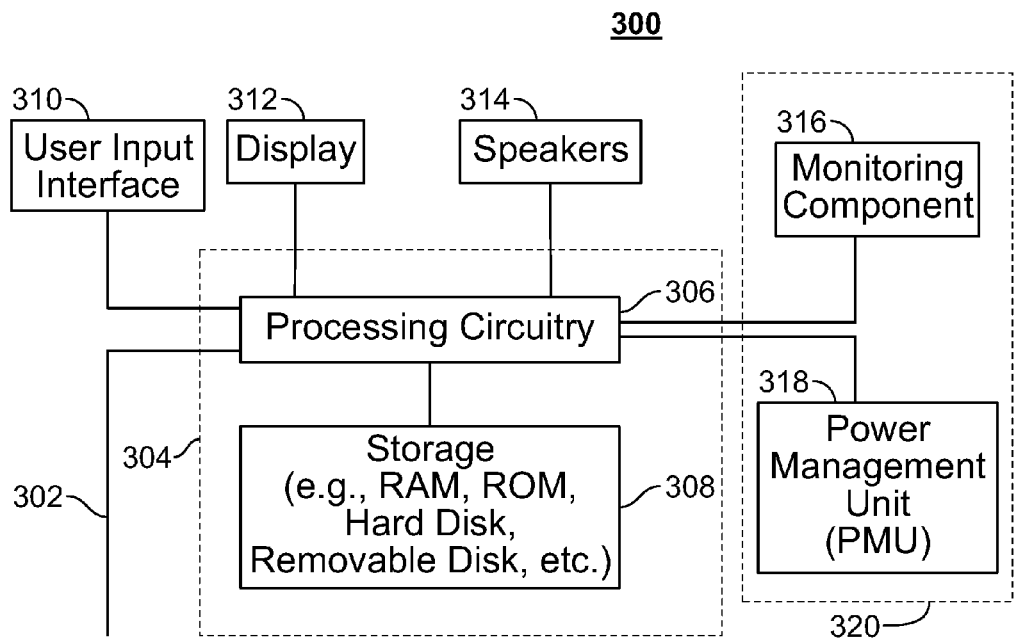
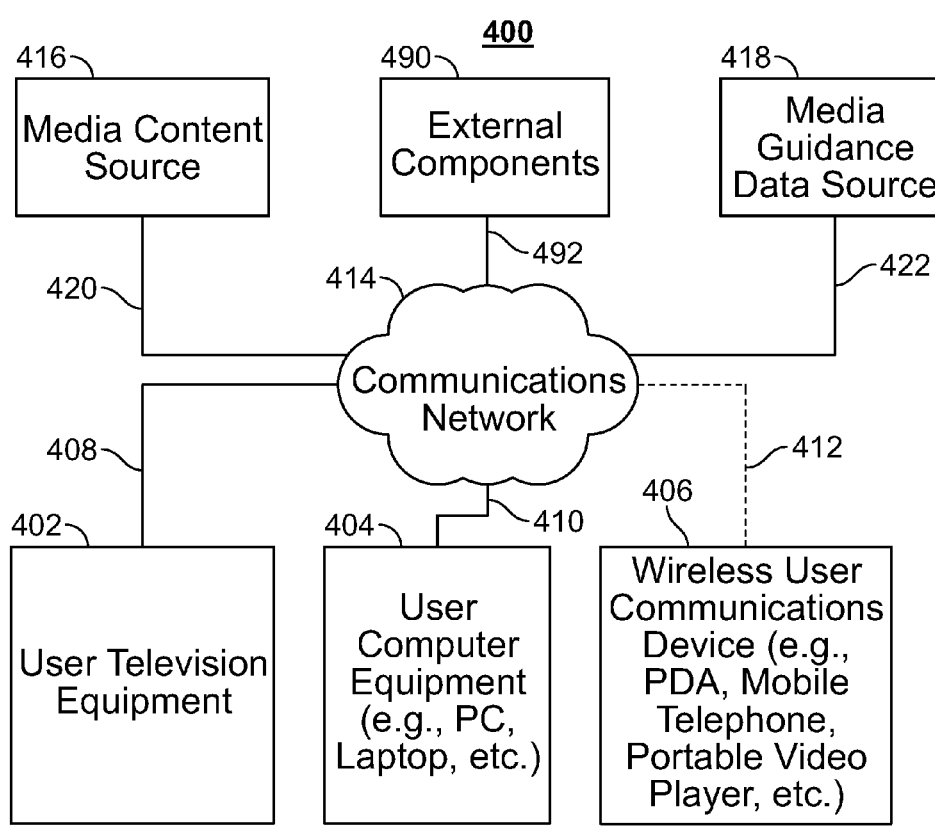
FIG. 3
FIG. 4

| Status of External Component | Media Action |
|---|---|
| Garage Door Opening; Lights Turning Off | Record Currently Received Content |
| Door Bell Rings; Front Door Opening | Pause Currently Received Content |
| Garage Door Closing; Lights Turning On | Play Previously Recorded Content |
| Kitchen Fridge Opening Dishwasher is On | Volume Up |
| ... | ... |

SYSTEMS AND METHODS FOR AUTOMATICALLY PERFORMING MEDIA ACTIONS BASED ON STATUS OF EXTERNAL COMPONENTS

BACKGROUND

In conventional systems, users have to manually decide to record or play back certain content when they leave or enter their home. Oftentimes, users forget to instruct the system to record content when they leave their home because they are in a hurry or have other distractions. This results in the users missing segments of content they were watching just before they left home.

SUMMARY

Accordingly, methods and systems are disclosed herein for automatically performing media actions based on the status of external components.

In some embodiments, a media asset may be determined to be presented on a user equipment device. For example, a determination may be made that the media asset has been presented for a threshold period of time or that a media asset meeting a content attribute is being presented on a user equipment device. Components external to the user equipment device may be monitored to obtain status information pertaining to the components. In some embodiments, the components may only be monitored if the media asset has been presented for a threshold period of time and matches a user profile.

In some implementations, in response to receiving status information from one or more external components, a determination may be made as to whether a media action is associated with the status information. If a media action is determined, the identified media action may be performed for the media asset. In some embodiments, the status information received from an external component may be cross-referenced with a database of media actions to identify a media action that is associated with the status information. For example, the database may include entries with fields of status information for various external components and corresponding fields for media actions to be taken when matching status information is received. In some embodiments, the external components continue to be monitored to obtain status information in response to determining that the media asset is not associated with the status information.

In some embodiments, the media action corresponding to the received status information may be an action to record. In such circumstances, the media guidance application may initiate recording of the media asset being presented starting from a currently received position that is later than the beginning of the media asset. In some embodiments, a second media action may be determined based on newly received status information. The second media action may be a playback action. In response to determining that the second media action is associated with the status information, the media asset has been recorded based on the first media action may be identified. The recorded media asset may be automatically presented starting from the currently received position that is later than the beginning of the media asset. For example, the media asset that was recorded (e.g., from some middle position because the status information indicated the user left home) may be retrieved and played back automatically starting from the same position at which the media asset started being recorded (e.g., playback may resume from the middle position because the updated status information may indicate that the user has returned home).

In some embodiments, the status information may be received from each external component over a network (e.g., a home network or the Internet). In some embodiments, the external components may include in-home appliances (e.g., refrigerators, ovens, garage doors, doorbells, front doors, etc.). In some embodiments, the media action may be determined to be associated with the status information when a combination of status information from a first and a second external component is indicative of the user leaving or entering a location of the first and second external components (e.g., a home).

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 is a block diagram of an illustrative user equipment device in accordance with some embodiments of the disclosure;

FIG. 4 is a block diagram of an illustrative media system in accordance with some embodiments of the disclosure;

FIG. 5 shows an illustrative database for associating media actions with the status of external components in accordance with some embodiments of the disclosure.

DETAILED DESCRIPTION

Figure 1:
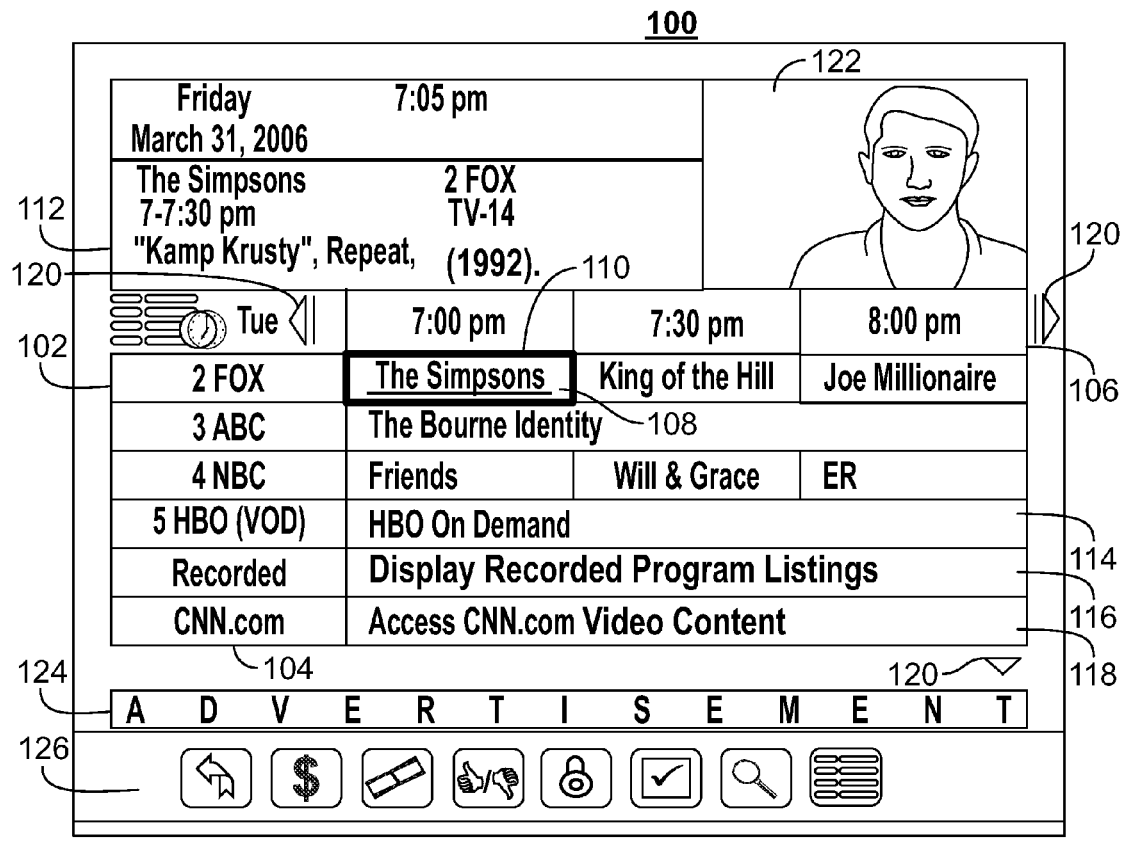
FIGS. 1 and 2 show illustrative display screens that may be used to provide media guidance application listings in accordance with an embodiment of the disclosure.

Methods and systems are disclosed herein for automatically performing media actions based on status of external components. For example, status information of in-home appliances is monitored to identify patterns that indicate that the user is leaving or entering the home. In response to determining, based on the status information, that the user is leaving the home, content that is currently being received and/or presented is recorded automatically. In response to determining, based on the status information, that the user is entering the home, content that was recorded (e.g., because the user left the home) is played back automatically.

As referred to herein, the phrase "external component" should be understood to mean any device that is external to a user equipment device on which media is presented. For example, the user equipment device may be a set-top-box (and/or television) and the external component may be an in-home appliance (e.g., a garage door, an oven, a dishwasher, a refrigerator, a stove, a fan, an air conditioner, coffee machine, lights, microwave, washing machine, dryer, shower, etc.). An in-home appliance may be any device that is not used to present media to a user.

As referred to herein, the term "status" or phrase "status information" should be understood to mean a current state of a component or change in a current state of a component. For example, change in a state of a component such as a garage door may indicate that the garage door is opening or closing. The current state of a component such as a garage door may indicate that the garage door is open or closed. Similarly, status of an oven may indicate an oven temperature and/or whether or not the oven is turned on. Status information and/or status may include any data identifying settings of the component (e.g., temperature, time remaining, speed, etc.).

With reference to media assets or content, the amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on machine or computer readable media. Machine or computer readable media includes any media capable of storing data. The machine or computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), subtitles, media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
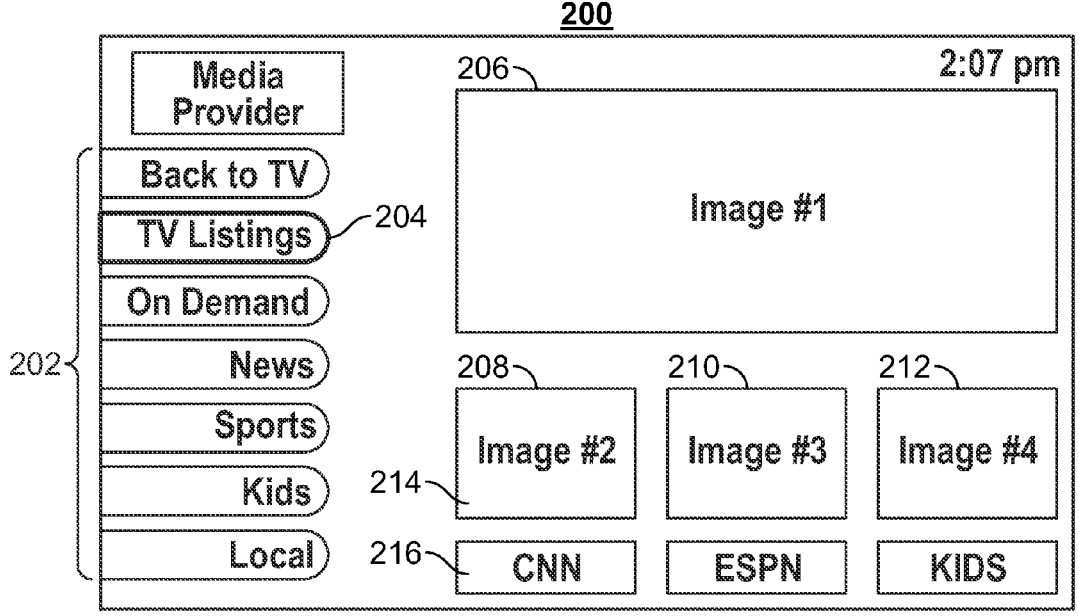

FIGS. 1 and 2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, a subtitles setting, or other features.

Options available from a main menu display may include search options, VOD options, parental control options, Internet options, cloud-based options, device synchronization options, second screen device options, options to access various types of media guidance data displays, options to subscribe to a premium service, options to enable/disable the subtitles setting, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

In some embodiments, user profile information may include biometric state and/or emotional state information. For example, the user profile may include associations of biometric states and emotional states with different categories of information based on user interactions with an application. For example, a media guidance application may store a profile of user interactions with action movies when the user is in an angry emotional state and store a profile of user interactions with drama movies when the user is in a depressed emotional state. The media guidance application may provide recommendations based on a determined biometric state and/or emotional state of a user and the stored user profile. In some embodiments, user profile information may include external components in the home of the user. For example, the user profile information may identify each external component in the user's home or each external component that is associated with the user and may include a communication address (e.g., IP address, e-mail address, etc.) associated with each component. The user equipment device may use the communication address of each external component to monitor the external component and receive status information pertaining to the component.

Another display arrangement for providing media guidance is shown in FIG. 2. Video mosaic display 200 includes selectable options 202 for content information organized based on content type, genre, and/or other organization criteria. Selection of option 204 may return the user to grid 102 (FIG. 1).

In display 200 listings 206, 208, 210, and 212 may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210 and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306, detecting circuitry 320 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry may also instruct detecting circuitry 320, which can be used to detect and/or identify a user or users without requiring the user or users to make any affirmative actions by using any suitable biometric determination technique, such as facial determination, brainwave information, body temperature determination, heart rate determination, odor determination, scent determination, body shape determination, voice determination, behavioral determination, and any other suitable biometric determination technique or any combination thereof.

Detecting circuitry 320 may include monitoring component 316 and power management unit 318. Monitoring component 316 may include one or more components (e.g., an EEG, EMG, pulse oximeter, etc.) for monitoring an activity type (e.g., biometric state, location, or brainwave information) of a user. As referred to herein, "location" refers to any relative or absolute identifier of a position, such as a geographical coordinate, vector for direction, street address, name of building, or any other suitable identifier. For example, a location may be indicated by coordinates in a geographic coordinate system (e.g., latitude or longitude), or a global positioning system (GPS).

It should be noted that monitoring component 316 may, in some embodiments, be located on a separate device in communication with the device upon which a media guidance application (and control circuitry 304) is implemented. For example, in some embodiments, monitoring component 316 may communicate with device 300 via a communications network (e.g., communications network 414 (FIG. 4)). In some embodiments, monitoring component 316 may be a wearable device (e.g., a wristband, headband, watch, etc.).

In some embodiments, monitoring circuitry may monitor the brain activity of a user. Monitoring component 316 may transmit updates (e.g., associated with brain activity) of a user to control circuitry 304. Control circuitry 304 may compare the updates to data related to brain activity (e.g., threshold ranges, frequency ranges, etc.) of the user and/or other users stored on storage 308 (e.g., to determine whether or not the brain activity of the user corresponds to a particular threshold range and/or mood, attentiveness level, activity type, a subtitles setting, etc.).

In some embodiments, monitoring component 316 may include one or more of a temperature sensor, a pulse oximeter, a motion sensor, an accelerometer, an optical sensor, or any other suitable sensor for determining a biometric state of a user. Monitoring component 316 may include any suitable hardware and/or software to perform biometric detection and determination operations. For example, monitoring component 316 may include infrared, optical, and/or radio-frequency receivers and/or transmitters. Monitoring component 316 may additionally, or alternatively, include one or more microphones and/or cameras to detect audible and/or visual information, respectively. The microphone may be capable of receiving sounds within the audible range and/or outside the audible range. The camera may be capable of capturing information within the visual spectrum and/or outside the visual spectrum. For example, the camera may be able to capture infrared information, ultraviolet information, or any other suitable type of information.

In some embodiments, detecting circuitry 320 may additionally, or alternatively, include palm, fingerprint, and/or retinal readers for detecting and/or identifying users based on biometric information about a user. In some embodiments, detecting circuitry may communicate to processing circuitry 306 and/or storage 308 various detection and/or identification mechanisms indicating whether a user is detected and/or identified at a particular device.

As referred to herein, the term "biometric state" should be understood to mean a metric or measure indicative of a physiological state of a user, such as measurements of chemical content in body fluids (e.g., salt electrolyte concentration in perspiration, blood alcohol level, hormonal levels in blood, glucose level in blood, oxygen content of blood), measurements of circulation (e.g., pulse, heart rate), body temperature, brain activity (e.g., measured via electroencephalograms), or any other suitable measurements. As referred to herein, the term "emotional state" should be understood to mean a metric of measure indicative of a psychological state or mental state of a user, such as angry, sad, depressed, happy, agitated, bored, or any other suitable state.

For example, using an infrared camera and light source, processing circuitry 306 may generate a three-dimensional map of an area. A plurality of IR beams may each be modulated and encoded to be distinguishable, transmitted from the IR light source and directed at various points in an area. Each of the beams may reflect off objects in the room back towards the camera. Depending on the distance traveled by each light beam, the time of flight, or time traveled by each light beam may vary. If the IR camera and light source are placed side by side, travel time of the light beam may correlate to the distance of an object from the light source and camera. The time of flight may be measured as the time between transmission of the encoded beam from the light source and detection of the encoded beam at the camera. By correlating the time of flight of beams, and the initial direction of the beam, processing circuitry 306 and/or detecting circuitry 320 may generate the three-dimensional map of the area. Based on the three-dimensional map, control circuitry 304 may detect and identify distinct bodies of users, and determine distance of the body from the biometric device. Using color cameras and face detection, control circuitry 304 may detect or identify users.

Using microphones and voice recognition, control circuitry 304 may detect or identify users based on the physical characteristics of their vocal tract through voice recognition or identification. Using a sound source and an array of microphones, control circuitry 304 may determine information about the shape of the area surrounding the biometric device through acoustic localization, similar to the time-of-flight method described above in reference to IR light. For example, a sound source may be located near an array of microphones. A sound broadcast from the sound source may propagate as a wave front away from the source. As the wave front impacts an object, portions of the wave front may be reflected toward the sound source and array of microphones. Depending on the position of the object, the reflected sound may arrive at the microphone at different times. For example, the reflected sound may arrive at a closer microphone in a shorter amount of time than it arrives at a farther microphone. Based on the time or phase difference in arrival time at various microphones, total travel time of the sound, and positions of the microphones, it may be possible to generate a spatial areal map. Location of objects may be determined based on the spatial areal map generated via acoustic localization, IR time of flight, and any other suitable mapping method, or any combination thereof. It should be understood that various biometric techniques and devices may be used alone, or in combination, to supplement each other to more accurately identify or detect users.

In some embodiments, voice recognition may be used to determine biometric and/or emotional states. For example, voice recognition may be performed on the speech of a user to find words spoken during certain biometric states. Detecting circuitry 320 or control circuitry 304 may correlate spoken words and other biometric states such as heart rate and body temperature for storage in cross-referencing databases. Analysis and correlation of vocal tones may also be performed.

In some embodiments, detecting circuitry 320 may use any suitable method to determine the distance, trajectory, and/or location of a user in relation to an electronic device. The electronic device may also use, for example, triangulation and/or time-difference-of-arrival determination of appropriate information to determine a user's location in relation to an electronic device. For example, time-difference-of-arrival values of sounds emanating from a user may be determined. In some embodiments, any suitable image processing, video processing, and/or computer vision technique may be used to determine a user's distance, trajectory, and/or location in relation to an electronic device. A user's distance, trajectory, and/or location in relation to an electronic device may be determined using any suitable method.

In some embodiments, detecting circuitry 320 and/or control circuitry may conduct analysis on information from one or more monitoring components 316 to determine gestures. For example, movements of a hand, detected by an accelerometer worn on a wrist of a user may be used to determine gestures at certain points in time. The gestures may be correlated with other biometric states, brainwave information, location information, and/or emotional states to determine whether to enable/disable the subtitles setting.

In some embodiments, processing circuitry 306 may determine a location based on global positioning system (GPS) measurements, or, in the case of cellular telephones, measurements based on cell-tower signals, done by detecting circuitry 320. Processing circuitry 306 may use these measurements to determine location coordinates, which may be transmitted to other electronic devices.

In some embodiments, detecting circuitry may be used to identify a user based on a determined biometric state or biometric information about the user. An identified user may refer to a user who may be recognized sufficiently by a device to associate the user with a user profile. In some embodiments, the user may be associated with a group of users, as opposed to, or in addition to, being associated with a unique user profile. For example, the user may be associated with the user's family, friends, age group, sex, and/or any other suitable group. A detected user may refer to a user whose presence is detected by a device, but who is not yet identified by the device.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. For example, storage 308 may be used to store database 500 that associates different status information of external components with media actions. Specifically, database 500 may include multiple entries. Each entry may include a status information field and a corresponding media action field. The status information field may represent status of one or more external components and the media action field may indicate the corresponding media action that should be taken for the status of the one or more external components. As referred to herein, the phrase "media action" should be understood to mean any activity the media guidance application can perform for a given media asset. For example, media actions may include scheduling a recording or reminder, tuning to a given media asset, accessing a given media asset, retrieving a media asset from storage, deleting a media asset, performing a playback operation (e.g., fast-forward, rewind, skip ahead, skip back) for a media asset, or any other type of media guidance function. Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device. System 400 may also include multiple external components 490 coupled to one or more of the user equipment devices.

In some embodiments, a user equipment device (e.g., user television equipment 402, user computer equipment 404, wireless user communications device 406) may be referred to as a "second screen device." The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices and one or more external components 490 may be coupled to communications network 414. Namely, user television equipment 402, user computer equipment 404, external components 490, and wireless user communications device 406 are coupled to communications network 414 via communications paths 408, 410, 492, and 412, respectively. Communications network 414 may be one or more networks including the Internet, a mobile phone network, in-home network, mobile voice or data network (e.g., a 4G, XLTE, and/or LTE network), cable network, public switched telephone network, or other types of communications network or combinations of communications networks. Paths 408, 410, 492, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Paths 412 and 492 are drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

The user equipment devices monitor external components 492 over communications path 492 to receive status information from external components 492. For example, user television equipment 402 may monitor one of the external components 490 (e.g., a garage door) to receive status information (e.g., information indicating whether the garage door is opening, closing, open or closed). User television equipment 402 may then cross-reference status information received from one or more external components 490 with database 500 to determine whether a media action is associated with the status information. For example, user television equipment 402 may receive status information from a garage door indicating the garage door is opening. User television equipment 402 may cross-reference database 500 with this status information and determine that the corresponding media action is to record currently received content. In response, user television equipment 402 may start recording a media asset currently being received from a current point that may be past the beginning of the media asset. For example, the user may have been watching a show on user television equipment 402. At some point in the middle of the show (e.g., 20 minutes past the start time), the user leaves the house by opening the garage door. This status of the garage door is provided to user television equipment 402 which in response begins recording the show starting from the point that is 20 minute past the start time.

Although communications paths are not drawn between user equipment devices and external components 490, these devices and components may communicate directly with each other via communication paths, such as those described above in connection with paths 408, 492, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, 492, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, 492, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, wireless user communications device 406 may include wearable devices (e.g., monitoring component 316) that are positioned on a user. For example, wireless user communications device 406 may include smart eyewear, smart watches, any other suitable user device that is wearable, or any combination thereof. The type of wearable device may affect the type of biometric state that can be determined. For example, a wearable headset device may include electrodes as part of monitoring component 316 and may be able to determine and monitor brain activity of a user. For example, a wearable ring device may include a temperature sensor to detect body temperature and may include a pulse oximeter to determine a pulse rate and a blood oxygen level.

In some embodiments, the media guidance application may monitor external components 490 to obtain status information from each external component 490. The media guidance application may monitor external components 490 continuously, periodically, or at any predefined or user-defined interval. To monitor external components 490, the media guidance application may transmit a request for status information to each external component 490. Alternatively, each external component 490 may transmit its respective status information to the media guidance application continuously, periodically, or at any predefined or user-defined interval. In some implementations, the media guidance application may maintain a database in storage 308 of all external components 490 in a user premises or home. The database may include, for each external component 490, the last updated status information received from the given external component along with a timestamp indicating when that status information was received. As the media guidance application receives status information from each external component, the media guidance application may update the corresponding database entry for that external component with the received status information and the timestamp of when the status information was received.

In some embodiments, status information for each external component 490 may be monitored and obtained without directly requesting status information from a given external component 490. For example, external components 490 may have direct or indirect access to the database of external components maintained by the media guidance application. Whenever a given external component detects a change in status, that external component may automatically communicate that status information to the database along with the timestamp of the status information (e.g., identifying when the status update occurred) and update the corresponding entry for the external component 490 without involving the media guidance application. In some cases, the external component 490 may indicate to the media guidance application that an update to the entry for the external component has been made. In response to receiving that indication, the media guidance application may proceed to determine whether a media action needs to be performed.

In some embodiments, the media guidance application may only monitor for status updates from external components 490 that occur within a threshold period of time of each other. For example, the media guidance application may determine whether the timestamp of a given status update from one external component is within a threshold of a timestamp for another status update from another external component. The timestamps may be retrieved for each status update from a database entry corresponding to the external component which stores the timestamp and the status information for each external component. The threshold period of time may be user defined, automatically set, predefined, and/or adjusted dynamically based on time of day and/or adjusted dynamically based on which external component provides the status information. For example, the media guidance application may receive status information from a garage door at a first point in time. Later, the media guidance application may receive status information from a doorbell at a second point in time that is five minutes after the first point in time. In some implementations, the threshold period of time may be ten minutes. As such, because the status information from the doorbell was received five minutes after the status information from the garage door, the media guidance application may determine that the status information from each of the external components was received within the threshold period of time of ten minutes. Accordingly, the media guidance application may generate the query to database 500 that includes the combination of the status information from each of the components received within the threshold period of time. Specifically, the media guidance application may generate the query to database 500 that includes the combination of the status information from the garage door and the doorbell. Database 500 may process the query to determine whether a match for the combination of status information exists in any entry and return to the media guidance application the corresponding media action if a match exists.

In some implementations, the threshold period of time may be three minutes. As such, because the status information from the doorbell was received five minutes after the status information from the garage door, the media guidance application may determine that the status information from each of the external components was not received within the threshold period of time of three minutes. Accordingly, the media guidance application may only query database 500 with the last received status information (e.g., the status information from the doorbell).

In some embodiments, the media guidance application may determine whether a media asset is being presented on a user equipment device. In some implementations, the media guidance application may initiate monitoring external components 490 only in response to determining that a media asset is being presented on a user equipment device. In some implementations, the media guidance application may initiate monitoring external components 490 only in response to determining that a media asset is being presented on a user equipment device of a particular type. For example, if the media asset is being presented on a wireless device, the media guidance application may not monitor external components 490. Specifically, if the media asset is being accessed on a wireless device, the user will likely continue accessing the media asset after leaving the home and therefore no appropriate media action may be necessary. However, if the media asset is being presented on a set top box, the media guidance application may monitor external components 490 to determine whether a media action is needed (e.g., because the user has left the home).

In some embodiments, the media guidance application may determine whether a media asset is being presented on a user equipment device for a threshold period of time. In some implementations, the media guidance application may initiate monitoring external components 490 only in response to determining that a media asset is being presented on a user equipment device for a threshold period of time. The threshold may be user defined, automatically set, predefined or dynamically adjusted based on content criteria of the media asset being presented or the device type used to present the media asset. In some implementations, the media guidance application may initiate monitoring external components 490 only in response to determining that a media asset is being presented on a user equipment device of a particular type and for at least the threshold period of time. For example, if the media asset is being presented on a wireless device for more than four minutes, the media guidance application may not monitor external components 490. Specifically, if the media asset is being accessed on a wireless device, the user will likely continue accessing the media asset after leaving the home and, therefore, no appropriate media action may be necessary. However, if the media asset is being presented on a set top box for more than six minutes, the media guidance application may monitor external components 490 to determine whether a media action is needed (e.g., because the user has left home).

In some embodiments, the media guidance application may determine whether a media asset being presented on a user equipment device matches a user profile. In some implementations, the media guidance application may initiate monitoring external components 490 only in response to determining that a media asset being presented on a user equipment device matches a user profile.

In some embodiments, in response to receiving status information from one or more external components 490, the media guidance application may determine whether a media action needs to be performed. Specifically, the media guidance application may determine whether a media action needs to be performed each time the database of external components status information is updated. In some implementations, the media guidance application may determine whether a media action needs to be performed each time new status information is received from one or more external components 490. To determine whether a media action needs to be performed, the media guidance application may cross-reference received status information with database 500.

In some embodiments, the media guidance application may generate an SQL query that includes the external component identifiers and corresponding status information. The media guidance application may transmit the SQL query to database 500 to determine whether an entry corresponding to the received status information exists. If any of the entries contain a status of external components field that matches the received status information, database 500 may return to the media guidance application the corresponding entry in the media action field. If none of the entries contains a status of external components field that matches the received status information, database 500 may return a NULL indication.

For example, the media guidance application may determine that a media asset is being presented on a user equipment device (e.g., a set-top-box). The media guidance application may monitor external components 490 (e.g., a garage door and lights in the home) to receive status information pertaining to these components. In response to receiving status information from the garage door indicating that the garage door is opening, the media guidance application may store this information in a database entry for the garage door along with a timestamp indicating when the update occurred. The media guidance application may also query database 500 to determine whether a media action is associated with this status information of the garage door. In some implementations, database 500 may indicate that no corresponding media action is available for status information indicating that the garage door is opening.

The media guidance application may continue monitoring external components 490 and may receive status information from lights in the home indicating that the lights are turning off. The media guidance application may store this status information in a database entry for the lights along with the timestamp. Also, the media guidance application may query database 500 to determine whether a media action is associated with the status information of the combination of the garage door opening and lights turning off. Database 500 may determine that a matching entry exists and that the associated media action is to record currently received content. For example, this combination of status information may be indicative of the user leaving the home. Accordingly, database 500 may return to the media guidance application the indication that the corresponding media action that exists is to record currently received content. In response, the media guidance application may initiate recording the currently received media asset starting from a currently received position which may be later than the beginning of the media asset (e.g., because the user was watching the media asset and left home in the middle of the media asset).

The entries in the status of the external components field in database 500 may include singular external components status or combinations of the status of the external components. For example, one entry in the status of the external components field may include only the dishwasher external component being turned on. This means that any time the status information for the dishwasher indicates that the dishwasher has been turned on, a match will be found in this database entry and a corresponding media action will be performed. Another entry in the status of external components field may include the combination of the status of the doorbell ringing and the front door opening. This means that any time the status information for the doorbell and the front door indicates that the doorbell is ringing and the front door is opening, a match will be found in this database entry and a corresponding media action will be performed. If only the doorbell is ringing and the front door has no change in status or is not opening, a match to this entry in the database will not be found.

In some embodiments, when a given entry includes a combination of status of external components, the different components listed in the entry may be associated with different degrees of weights. These weights may be used to vary the importance of different status change requirements for different components to match entries in database 500. This provides more flexibility in terms of matching status in database 500.

In some embodiments, when a given entry includes a combination of status of external components, the different components listed in the entry may be associated with different ordering. The ordering may specify that one status change to one component must happen before the status change to another component. For example, doorbell ringing and front door opening may both in a given entry that is associated with a media action for pausing content. Also, the database entry may indicate that the doorbell ringing must happen before the front door opens for the media action to be performed. If the media guidance application identifies a status change of the doorbell indicating the doorbell is ringing and further detects a status change to the front door indicating the front door is opening, the media guidance application may send these updates to database 500 with the corresponding time stamps. Database 500 may determine that the entry for the front door opening and doorbell ringing requires a particular order. Accordingly, database 500 may determine whether the doorbell ringing is associated with an earlier timestamp than the front door opening. In response to determining that the doorbell ringing is associated with an earlier timestamp than the front door opening, database 500 may return the corresponding media action of pausing to the media guidance application. However, in response to determining that the doorbell ringing is associated with a later timestamp than the front door opening, database 500 may indicate there are no matching entries for the received external component status changes to the media guidance application and no media action is performed.

In some embodiments, the media guidance application may allow the user to modify or add entries to database 500 using a user interface. For example, the user may input any number of external components and status information for each, along with a corresponding media action to be performed when the status of the specified external components match the user input status information. This allows the user to customize media actions based on a user-specified external component status. For example, the user may notice that he usually turns on the microwave turning on and opens the front door when he is about to leave. In addition, the user may wish to have the user equipment device turn off when the user leaves. Accordingly, the user may store an entry in database 500 that includes: in the status of external components, the microwave turning on and the front door opening and in the corresponding media action field, turn off the user equipment device. When the media guidance application detects the status information for these two external components that matches the user specified entry, the media guidance application may perform the action of turning off the user equipment device.

In some embodiments, the media guidance application may automatically modify or add entries to database 500 based on monitored user actions. For example, the media guidance application may determine that the user usually reduces the volume of the user equipment device when the dishwasher turns off. Accordingly, the media guidance application may store an entry in database 500 that includes: in the status of external components, the dishwasher turning off and in the corresponding media action field, reducing the volume of the user equipment device. When the media guidance application detects the status information for this external component that matches the automatically added entry, the media guidance application may perform the action of reducing volume of the user equipment device.

In some embodiments, the media guidance application may monitor external components 490 even when a media asset is not being presented on a user equipment device. For example, the media guidance application may monitor external components 490 (e.g., a garage door and lights in the home) to receive status information pertaining to these components. In response to receiving status information from the garage door indicating that the garage door is closing, the media guidance application may store this information in a database entry for the garage door. The media guidance application may also query database 500 to determine whether a media action is associated with this status information of the garage door. In some implementations, database 500 may indicate that no corresponding media action is available for status information indicating that the garage door is closing.

The media guidance application may continue monitoring external components 490 and may receive status information from lights in the home indicating that the lights are turning on. The media guidance application may store this status information in a database entry for the lights. Also, the media guidance application may query database 500 to determine whether a media action is associated with the status information of the combination of the garage door closing and lights turning on. Database 500 may determine that a matching entry exists and that the associated media action is to play previously recorded content. For example, this combination of status information may be indicative of the user coming back home. Accordingly, database 500 may return to the media guidance application the indication that the corresponding media action that exists is to play previously recorded content. In response, the media guidance application may initiate playback of content stored on a user equipment device.

In some implementations, the recorded content that the media guidance application may select for playback may be the same content that was recorded as a result of the user leaving the home (e.g., when the status information indicated that the garage door was opening and the lights were turning off). Specifically, the media guidance application may play content that was recorded as a result of a media action being performed based on status information of external components 490. In some implementations, the recorded content may be played automatically starting from the point at which the content started being recorded based on the status information of external components 490. For example, a show may have started being recorded at a point that is 20 minutes past the beginning because the user left home (e.g., determined based on the garage door opening and the lights being turned off). Upon the user returning home (e.g., determined based on the garage door closing and the lights turning on), the same media asset may be automatically played back from the same position at which it was recorded (e.g., starting from the point that is 20 minutes past the beginning of the show). This allows the user to pick up the show where the user left off just before leaving home.

In some embodiments, the status of external components 490 may be indicative of a house guest arriving or an interruption at the front door. If the user was accessing content on a user equipment device when this happens, the media guidance application may automatically pause the content the user was accessing so the user does not miss any portion of the show. For example, the media guidance application may receive status information from a doorbell indicating that it is ringing and status information from a front door indicating the front door is opening. This combination may be indicative of a house guest arriving or an interruption at the front door. Accordingly, based on a match for this status information in database 500, the media guidance application may perform the media action that includes pausing the currently received content on the user equipment device.

Figure 6:
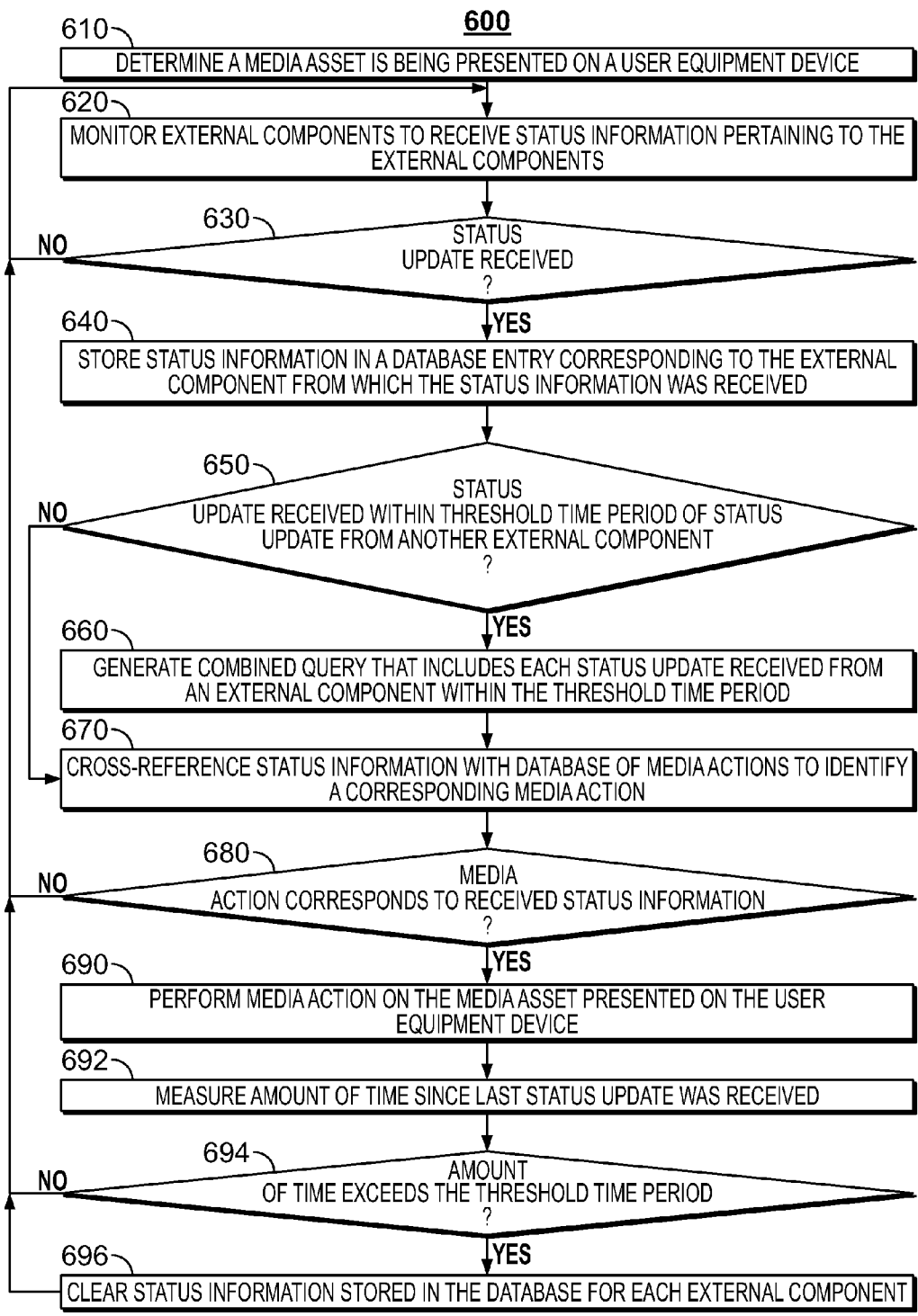
FIG. 6 is a diagram of a process for automatically performing media actions based on the status of external components in accordance with some embodiments of the disclosure.

FIG. 6 is a diagram of a process 600 for automatically performing media actions based on status of external components in accordance with some embodiments of the disclosure. At step 610, a determination is made that a media asset is being presented on a user equipment device. For example, the media guidance application may determine that a user equipment device (e.g., a set top box) is presenting a media asset.

At step 620, external components are monitored to receive status information pertaining to the external components. For example, the media guidance application may communicate with external components 490 (FIG. 4) to receive status information from external components 490. In some implementations, external components 490 may transmit status information to the media guidance application whenever there is a status update or change. In some implementations, the media guidance application may poll each external component 490 at continuous or periodic intervals to obtain the status information.

At step 630, a determination is made as to whether a status update was received. In response to determining that a status update was received, the process proceeds to step 640; otherwise, the process proceeds to step 620. For example, the media guidance application may determine whether status information was received from a given external component 490. In some implementations, an external component with a status update may transmit an indication to the media guidance application that a status update is available. In response to receiving this indication, the media guidance application may retrieve from a database entry for that external component the status information pertaining to the external component.

At step 640, status information is stored in a database entry corresponding to the external component from which the status information was received. For example, the media guidance application may update an entry for the external component with the received status information. In some implementations, the external component may automatically (independently from the media guidance application) update the status information in the database entry for the external component. The media guidance application may access the database entry to retrieve the status information for the external component.

At step 650, a determination is made as to whether the status update was received within a threshold time period of a status update from another external component. In response to determining that the status update was received within the threshold time, the process proceeds to step 660; otherwise, the process proceeds to step 670. For example, the database entry for each external component may include a field indicating the timestamp of when the status information was last received from the corresponding external component. Upon receiving status information from a given external component, the media guidance application may compare the timestamp of the newly received status information with the timestamp of other status information stored in the database for other external components (e.g., those external components for which status information is stored in the database). The media guidance application may compute whether the timestamp of the newly received status information is within a threshold time period of the timestamp of other previously received status information for other external components.

At step 660, a combined query that includes each status update received from an external component within the threshold time period is generated. For example, the media guidance application may generate an SQL query that includes an identification of each external component from which status information was received (e.g., within a threshold time period) and the status information that was received.

At step 670, status information is cross-referenced with a database of media actions to identify a corresponding media action. For example, the media guidance application may transmit an SQL query to database 500 that includes an identification of one or more external components and their corresponding status information.

At step 680, a determination is made as to whether a media action corresponds to received status information. In response to determining that the media action corresponds to received status information, the process proceeds to step 690; otherwise, the process proceeds to step 620. For example, database 500 may determine whether the external components identified in a received SQL query and their corresponding status information matches any of the status of external component fields. If there is a match, database 500 may identify and retrieve the corresponding media action.

At step 690, the media action is performed on the media asset presented on the user equipment device. For example, a media action to record a currently received media asset may be performed by the media guidance application by recording the currently received content by the user equipment device. In some embodiments, the currently received content may be recorded starting from the current play position which may be later than the beginning of the content.

At step 692, an amount of time is measured since the last status update was received. For example, the media guidance may run a timer that restarts each time an update is received from a given external component. This timer may be used to clear out or remove old or stale status updates in the database that maintains status information from various external components. Accordingly, only recently received status updates may be cross-referenced with database 500 to identify corresponding media actions to be performed.

At step 694, a determination is made as to whether the amount of time exceeds the threshold time period. In response to determining that the amount of time exceeds the threshold time period, the process proceeds to step 696; otherwise, the process proceeds to step 620.

At step 696, status information stored in the database for each external component is cleared. For example, the media guidance application may remove all of the status information from each entry for each external component. This may avoid the media guidance application relying on old status updates to identify media actions.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for automatically performing a media action based on status of external components, the method comprising:
   determining a media asset is being presented on a user equipment device;
   storing a database that includes a plurality of entries, wherein each of the plurality of entries includes a status information field, that includes first and second status information for at least two external components, and a media action field that includes a given media action corresponding to the status information field;
   monitoring components external to the user equipment device to obtain status information pertaining to the components;
   in response to determining a change in status of a first external component, based on the monitoring, searching the plurality of entries stored in the database for a given entry for which one of the at least two external components in the status information field matches the first external component;
   retrieving data from the given entry that identifies a second of the at least two external components in the status information field of the given entry;
   receiving, from the second of the at least two external components, status information;
   comparing the change in status of the first external component and the status information received from the second external component to the first and second status information stored in the given entry;
   in response to determining that the change in status of the first external component and the status information received from the second external component match the first and second status information stored in the given entry, retrieving the given media action from the media action field of the given entry; and
   performing the given media action for the media asset in response to retrieving the given media action from the media action field of the given entry.

2. The method of claim 1 further comprising continuing to monitor the components to obtain status information.

3. The method of claim 1, wherein the given media action is a first media action that includes recording, and wherein performing the given media action comprises initiating recording of the media asset starting from a currently received position that is later than the beginning of the media asset.

4. The method of claim 3 further comprising:
determining whether a second media action is associated with the status information of the given entry, wherein the second media action includes playback;
in response to determining that the second media action is associated with the status information of the given entry, determining that the media asset has been recorded based on the first media action; and
automatically presenting the recorded media asset starting from the currently received position that is later than the beginning of the media asset.

5. The method of claim 1, wherein monitoring the components comprises receiving status information from each of the components over a network.

6. The method of claim 1, wherein the components include a plurality of in-home appliances.

7. The method of claim 1, wherein a combination of first status information for a first component and second status information for a second component is indicative of a user leaving or entering a location of the first and second components.

8. The method of claim 1 further comprising determining whether the media asset has been presented for a threshold time interval and matches a user profile.

9. The method of claim 8, wherein the components are monitored in response to determining the media asset has been presented for the threshold time interval and matches the user profile.

10. A system for automatically performing a media action based on status of external components, the system comprising:
control circuitry configured to:
determine a media asset is being presented on a user equipment device;
store a database that includes a plurality of entries, wherein each of the plurality of entries includes a status information field, that includes first and second status information for at least two external components, and a media action field that includes a given media action corresponding to the status information field;
monitor components external to the user equipment device to obtain status information pertaining to the components;
in response to determining a change in status of a first external component, based on the monitoring, search the plurality of entries stored in the database for a given entry for which one of the at least two external components in the status information field matches the first external component;
retrieve data from the given entry that identifies a second of the at least two external components in the status information field of the given entry;
receive, from the second of the at least two external components, status information;
compare the change in status of the first external component and the status information received from the second external component to the first and second status information stored in the given entry;
in response to determining that the change in status of the first external component and the status information received from the second external component match the first and second status information stored in the given entry, retrieve the given media action from the media action field of the given entry; and
perform the given media action for the media asset in response to retrieving the given media action from the media action field of the given entry.

11. The system of claim 10, wherein the control circuitry is further configured to continue to monitor the components to obtain status information.

12. The system of claim 10, wherein the given media action is a first media action that includes recording, and wherein the control circuitry is further configured to perform the given media action by initiating recording of the media asset starting from a currently received position that is later than a beginning of the media asset.

13. The system of claim 12, wherein the control circuitry is further configured to:
determine whether a second media action is associated with the status information of the given entry, wherein the second media action includes playback;
in response to determining that the second media action is associated with the status information of the given entry, determine that the media asset has been recorded based on the first media action; and
automatically present the recorded media asset starting from the currently received position that is later than the beginning of the media asset.

14. The system of claim 10, wherein the control circuitry is configured to monitor the components by receiving status information from each of the components over a network.

15. The system of claim 10, wherein the components include a plurality of in-home appliances.

16. The system of claim 10, wherein a combination of first status information for a first component and second status information for a second component is indicative of a user leaving or entering a location of the first and second components.

17. The system of claim 10, wherein the control circuitry is configured to determine whether the media asset has been presented for a threshold time interval and matches a user profile.

18. The system of claim 17, wherein the components are monitored in response to determining the media asset has been presented for the threshold time interval and matches the user profile.

* * * * *